United States Patent
Sirotkin et al.

(10) Patent No.: US 12,267,736 B2
(45) Date of Patent: Apr. 1, 2025

(54) USER-EQUIPMENT-BASED MOBILITY OPTIMIZATION

(71) Applicant: APPLE INC., Cupertino, CA (US)

(72) Inventors: Alexander Sirotkin, Herzliya (IL); Fangli Xu, Beijing (CN); Haijing Hu, Los Gatos, CA (US); Naveen Kumar R. Palle Venkata, San Diego, CA (US); Pavan Nuggehalli, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,086

(22) PCT Filed: Aug. 30, 2021

(86) PCT No.: PCT/CN2021/115358
§ 371 (c)(1),
(2) Date: Sep. 22, 2021

(87) PCT Pub. No.: WO2023/028762
PCT Pub. Date: Mar. 9, 2023

(65) Prior Publication Data
US 2024/0031882 A1    Jan. 25, 2024

(51) Int. Cl.
*H04W 36/00* (2009.01)
*H04W 36/36* (2009.01)
*H04W 76/20* (2018.01)

(52) U.S. Cl.
CPC . *H04W 36/0061* (2013.01); *H04W 36/00835* (2018.08); *H04W 36/362* (2023.05); *H04W 76/20* (2018.02); *H04W 36/36* (2013.01)

(58) Field of Classification Search
CPC ........... H04W 36/00; H04W 36/00835; H04W 36/0061; H04W 36/00837; H04W 36/362
See application file for complete search history.

(56) References Cited

U.S. PATENT DOCUMENTS

| | | | |
|---|---|---|---|
| 9,706,469 | B2 | 7/2017 | Himayat et al. |
| 10,219,281 | B2 | 2/2019 | Sirotkin |
| 2021/0176681 | A1* | 6/2021 | Ozturk ............ H04W 36/00837 |
| 2021/0235334 | A1* | 7/2021 | Purkayastha ......... H04W 40/36 |
| 2023/0300691 | A1* | 9/2023 | Eklöf ................ H04W 36/0069 370/331 |

FOREIGN PATENT DOCUMENTS

| | | |
|---|---|---|
| CN | 112385267 | 2/2021 |
| CN | 112823544 | 5/2021 |
| WO | 2021118418 | 6/2021 |

OTHER PUBLICATIONS

Article entitled, "Use cases, AI/ML algorithms, and general concepts", Intel Corporation, 3GPP TSG-RAN WG3 Meeting #110-e, Electronic meeting, R3-206403, dated Nov. 13, 2020 in 6 pages.

(Continued)

*Primary Examiner* — Iqbal Zaidi
(74) *Attorney, Agent, or Firm* — Kilpatrick Townsend & Stockton LLP

(57) ABSTRACT

The present application relates to devices and components including apparatus, systems, and methods for user equipment (UE)-based mobility optimization are described herein, including machine learning (ML)-assisted techniques.

20 Claims, 14 Drawing Sheets

(56) References Cited

OTHER PUBLICATIONS

International Search Report and Written Opinion issued in PCT Application No. PCT/CN2021/115358, dated Mar. 28, 2022 in 9 pages.
Karabulut et al., article entitled, "RACH Optimization with Decision Tree Based Supervised Learning for Conditional Handover in 5G Beamformed Systems," arXiv:1910.11890v3 [cs.NI], dated Feb. 9, 2021 in 8 pages.
Peltonen et al., article entitled, "A Comprehensive Formal Analysis of 5G Handover," WiSec '21, June 28-Jul. 2, 2021, Abu Dhabi, United Arab Emirates, ACM, ISBN 978-1-4503-8349-3/21/06 in 12 pages.
Draft Change Request form R2-1916490, entitled, "Correction of UE assistance information," Samsung, R2, NR_newRAT-Core, 3GPP TSG-RAN WG2 #108, Reno, USA, Nov. 14-18, 2019 in 5 pages.
Change Request form R2-2005987 was R3-204440, entitled, "Baseline CR for introducing Rel-16 NR mobility enhancement," R3 (Intel Corporation, Ericsson, Huawei), R2, NR_Mob_enh-Core, 3GPP TSG RAN WG2#110-e, Electronic meeting, Jun. 1-12, 2020 in 19 pages.
3GPP™ Work Item Description, RP-201620 entitled, "Revised SID: Study on enhancement for data collection for NR and ENDC," CMCC, Agenda Item: 9.7.13, 3GPP TSG RAN Meeting #89e, Electronic Meeting, Sep. 14-18, 2020 in 4 pages.
Lee et al., article entitled, "Prediction-Based Conditional Handover for 5G MM-Wave Networks," IEEE Vehicular Technology Magazine | Mar. 2020, *Digital Object Identifier* 10.1109/MVT.2019. 2959065, *Date of current version*: Jan. 14, 2020 in 9 pages.
Technical Report entitled, "3rd Generation Partnership Project; Technical Specification Group RAN; Evolved Universal Terrestrial Radio Access (E-UTRA) and NR; Study on enhancement for Data Collection for NR and EN-DC (Release 17)," 3rd Generation Partnership Project (3GPP), 3GPP TR 37.817 V0.2.0 (May 2021), 3GPP, Release 17 in 11 pages.
Article entitled, "This is the key to mobility robustness in 5G networks," Ericsson, printed from https://www.ericsson.com/en/blog/2020/5/the-key-to-mobility-robustnes, dated May 21, 2020 in 10 pages.
Technical Specifcation entitled, "NR and NG-RAN Overall description; Stage-2 (3GPP TS 38.300 version 16.5.0 Release 16)," 5G; NR; ETSI TS 138 300 V16.5.0 (Apr. 2021), RTS/TSGR-0238300vg50 in 153 pages. [cited for Section 9.2.3].
Technical Specification entitled, "Radio Resource Control (RRC); Protocol specification (3GPP TS 38.331 version 16.4.1 Release 16)," 5G; NR; ETSI TS 138 331 V16.4.1 (Apr. 2021), RTS/TSGR-0238331vg41 in 932 pages. [cited for Sections 5.3.5, 5.7.4, 6.2.2, and 11.2.2].
International Preliminary Report on Patentability issued in PCT Application No. PCT/CN2021/115358, dated Mar. 14, 2024 in 5 pages.

* cited by examiner

```
UEAssistanceInformation-v1xyz-IEs ::= SEQUENCE {
    mobilityAssistance      MobilityAssistance      OPTIONAL,
    nonCriticalExtension    SEQUENCE {}             OPTIONAL
}

MobilityAssistance ::= SEQUENCE {
    candidateBestTargetCell   PhysCellId
}
```

Figure 3

```
MobilityAssistance ::= SEQUENCE {
    candidateBestTargetCell    PhysCellId,
    ...
}

RRCReconfigurationComplete-v1xyz-IEs ::= SEQUENCE {
    condMobilityAssistance     CondMobilityAssistance          OPTIONAL,
    ...
}

CondMobilityAssistance ::= SEQUENCE {
    rejectedCellsList          CandidateCellList               OPTIONAL,  -- Need N
    suggestedCellsList         CandidateCellList               OPTIONAL,  -- Need N
}

CandidateCellList ::= SEQUENCE (SIZE (1.. maxNrofCondCells-r16)) OF MobilityAssistance
```

Figure 6

USER-EQUIPMENT-BASED MOBILITY OPTIMIZATION

This application is a 35 U.S.C. § 371 National Stage Entry of International Application No. PCT/CN2021/115358, filed on Aug. 30, 2021, which is incorporated herein by reference in its entirety for all purposes.

BACKGROUND

Third Generation Partnership Project (3GPP) Technical Specifications (TSs) define standards for wireless networks. These TSs describe aspects related to mobility for operation within such networks.

BRIEF DESCRIPTION OF THE DRAWINGS

FIG. 3 shows one example of an Abstract Syntax Notation One (ASN.1) signaling description according to some embodiments.

FIG. 6 shows one example of an ASN.1 signaling description according to some embodiments.

DETAILED DESCRIPTION

Figure 1:
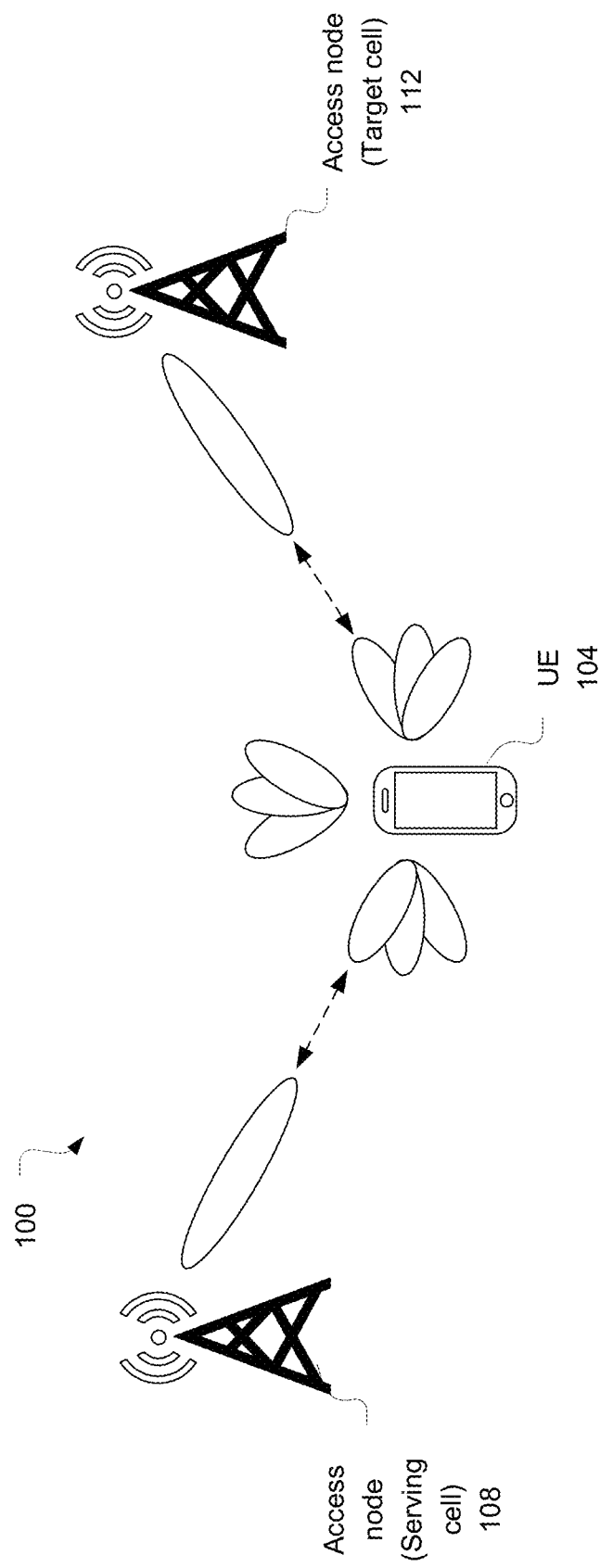
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below).

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for user equipment (UE)-based mobility optimization are described herein, including machine learning (ML)-assisted techniques. FIG. 1 illustrates a network environment 100 in accordance with some embodiments. The network environment 100 may include a UE 104 and one or more access nodes such as, for example, access nodes 108 and 112. The UE 104 may communicate with access nodes 108 and 112 over air interfaces compatible with 3GPP TSs, such as those that define Long Term Evolution (LTE) or Fifth Generation (5G) new radio (NR) system standards (e.g., over an NR-Uu interface). Each access node 108 and 112 may provide one or more 5G New Radio (NR) cells to provide NR user plane and control plane protocol terminations toward the UE 104. Each access node 108 and 112 may be, or may be controlled by, a base station, such as a next generation node B (gNB).

For descriptions of embodiments herein, the access node 108 may provide a serving cell with which the UE 104 is initially communicatively coupled and the access node 112 may provide a target cell. The UE 104 and access nodes 108/112 may cooperate to hand off the communication session of the UE 104 from the serving cell to the target cell (e.g., in accordance with a predefined handover (HO) procedure) in order to sustain the connection of UE 104 to the network.

In some embodiments, the access node 112 may be a neighbor base station that provides coverage for an adjacent geographical location. In such an embodiment, the access node 112 may provide a neighbor cell that operates independently and distinctly from the serving cell.

In some embodiments, the access node 108 may be one of a plurality of access nodes that provides service to the UE 104 through a dual connectivity (DC) operation. The access nodes may be coupled with each other via an X2 interface over an ideal or non-ideal backhaul. The access nodes may include a master node (MN) to provide a control plane connection to a core network. The MN may be associated with the group of serving cells referred to as a master cell group (MCG). The access nodes may further include a secondary node (SN) that may not have a control plane connection to the core network. The SN may be used to provide additional resources to the UE 104. The SN may be associated with a group of serving cells referred to as a secondary cell group (SCG). In these embodiments, the access node 108 may represent a first SN that provides a primary cell of the SCG (PSCell) and the access node 112 may represent a second SN. The handover may then involve the UE 104 transitioning the PSCell from the first SN to the second SN.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The UE 104 may communicate with access nodes 108/112 over bands in Frequency Range 1 (FR1) or in Frequency Range 2 (FR2). For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Anticipation of UE mobility can be helpful in optimizing handover (HO) preparation and/or measurements configuration. Prediction of the best future cell candidate for HO (or prediction of multiple suggested candidate cells for HO), for example, may be helpful for reducing an incidence of HO failure. Prediction of the visibility of certain measurement objects, for example, may be helpful for reducing UE power consumption.

In theory, prediction of UE mobility can be done either in the gNB or in the UE. Network-based prediction may avoid standards impacts (for example, it may be performed without requiring additional data transfer between the UE and the network). However, network-based prediction may also have some disadvantages. For example, collection of UE mobility information in the network may pose privacy concerns, and it may be desired that a gNB is not able to correlate cell radio network temporary identifiers (C-RNTIs) belonging to the same UE. For such reasons, a network-based prediction scheme may be limited to a generalized model that is applicable to all UEs, and such a generalized model may miss easy optimization scenarios (for example, a user traveling along the same path every weekday to work).

In contrast, a trained mobility prediction model that is UE-based may be UE-specific and thus more precise, and user privacy may also be preserved. It may be desired to use ML to predict UE mobility, and techniques disclosed herein include UE mobility optimization for 3GPP based on machine learning (ML), which may be implemented in one or more higher layers of the control plane protocol stack (e.g., in the radio resource control (RRC) layer). For example, a UE may include an ML model that is trained to predict the next best candidate cell(s) and/or beam(s), and the UE may notify the network about the cell and/or beam candidate(s) that are most likely to be used. Potential benefits of training the model in the UE may include preserving user privacy and/or obtaining a trained model that is more precisely tailored to the mobility patterns of that particular user.

However, because the mobility in NR is controlled by the network, a UE-based prediction scheme may require some standards modification to allow the UE to notify the network of the prediction (e.g., of the best target cell candidate(s)). Such prediction may be applicable to regular HO, conditional HO (CHO), beam mobility, beam failure prediction, and/or dual connectivity (DC).

In a regular HO procedure (also called "baseline HO"), the HO is controlled by the network (e.g., the network indicates when and to which target cell the handover is to occur). If a UE can predict the next target cell(s), it can notify the network of this prediction. The network may take that information into account when determining the target cell for HO, thus selecting a potentially better HO target cell. Potential advantages of such an approach may include mobility robustness (for example, a reduction in the number of HO failures).

Figure 2:
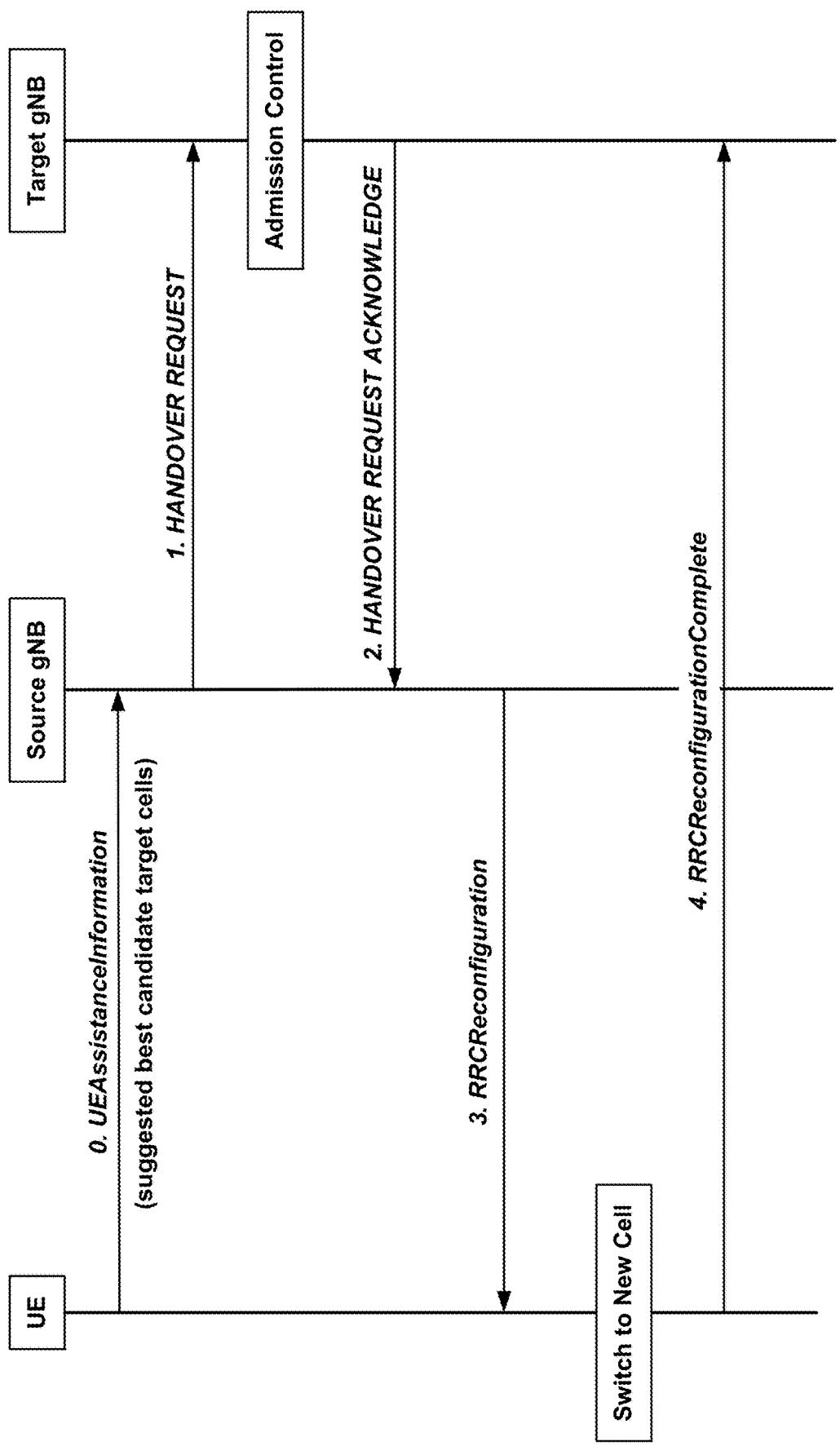
FIG. 2 shows an example call flow according to some embodiments.
Figure 9:
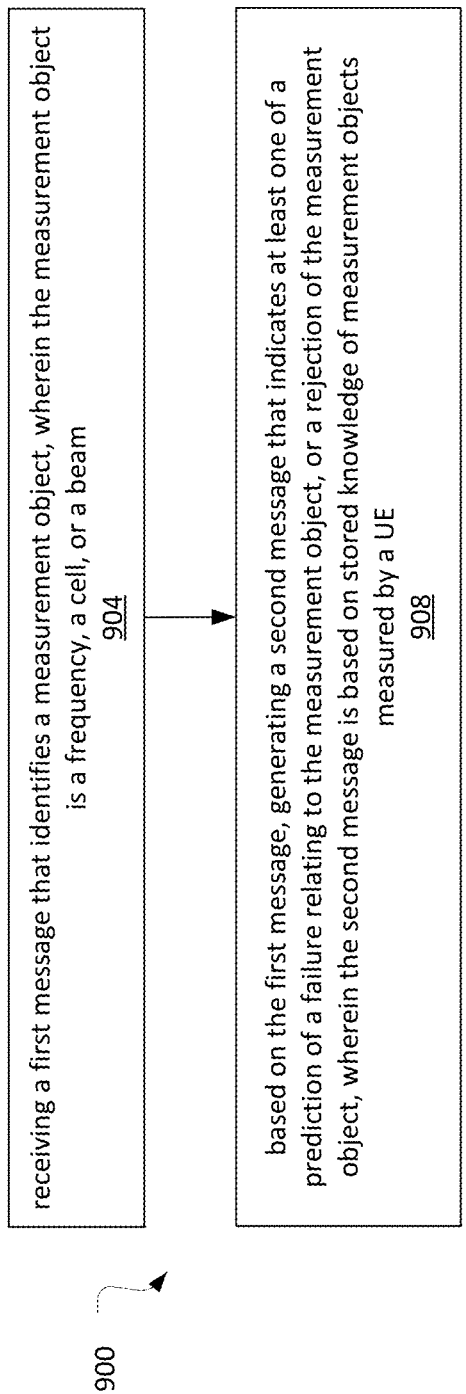
FIG. 9 illustrates an operational flow/algorithmic structure in accordance with some embodiments.

FIG. 2 shows one example of a call flow in which a UE-based prediction as described above is incorporated into a HO procedure. In this example, the UE-based prediction is incorporated into an inter-gNB handover procedure (e.g., as illustrated in Figure 9.2.3.1-1 of 3GPP TS 38.300, "5G; NR; NR and NG-RAN Overall description; Stage-2," v16.5.0 (2021-04)).

At stage 0 of the call flow, the UE notifies the network of its prediction of the next target cell(s). For example, the UE may notify the network by sending the cell identit(y/ies) of the predicted next target cell(s) to the source gNB within an assistance message, which may be a radio resource control (RRC) message. A UEAssistanceInformation message (as described, for example, in clause 6.2.2 ("Message definitions") of 3GPP TS 38.331 ("5G; NR; Radio Resource Control (RRC); Protocol specification"), V16.4.1 (2021-04)) is one example of an assistance message that a UE may use to indicate UE assistance information to the network. In other embodiments, the UE may use a different message to notify the network of its prediction of the next target cell(s).

In the particular example shown in FIG. 2, the UE uses a UEAssistanceInformation RRC message to send its prediction of the next target cell(s) to the source gNB. FIG. 3 shows one example of an Abstract Syntax Notation One (ASN.1) signaling description that may be incorporated into such a message. In practice, the string "vlxyz" shown in this example may be replaced with the particular version number of the specification in which the embodiment is introduced (e.g., "v1710" for version 17.1.0). As shown in FIG. 3, this example of the UEAssistanceInformation RRC message includes a mobilityAssistance information element (IE) having a candidateBestTargetCell field, where the value of the candidateBestTargetCell field indicates the Physical Cell ID of a suggested target cell.

In the example of FIG. 3, the UE indicates one candidate target cell by using its Physical Cell Identity (PCI). Additionally or alternatively, the UE may indicate a candidate target cell (e.g., within an assistance message, such as a UEAssistanceInformation message) by using one or more other identifiers (e.g., NR cell identity (NCI), NR cell global identifier (NCGI)). Additionally or alternatively, the UE may report (e.g., within an assistance message, such as a UEAssistanceInformation message) two or more candidate target cells. In such case, the report may also include a weight for each identified candidate target cell, where the weight may indicate, for example, a likelihood of HO success for the candidate.

At stage 1 of the call flow as shown in FIG. 2, the source gNB may initiate the handover procedure by issuing a HANDOVER REQUEST (e.g., over an Xn interface) to the target gNB. The target gNB may be a candidate target cell as indicated by the UE to the source gNB in stage 0. At stage 2, the target gNB provides a HANDOVER REQUEST ACKNOWLEDGE that includes a new RRC configuration. At stage 3, the source gNB commands the UE to perform a reconfiguration of the RRC connection by forwarding the RRCReconfiguration message received in the HANDOVER REQUEST ACKNOWLEDGE to the UE. At stage 4, the UE moves the RRC connection to the target gNB and confirms the reconfiguration by sending a RRCReconfigurationComplete message to the target gNB.

Conditional handover (CHO) was introduced in 3GPP NR Release 16 to improve mobility robustness and reliability of the baseline HO procedure. In a CHO procedure, the access node 108 may pre-configure the UE 104 with handover assistance information with respect to one or more candidate cells, and may provide each of the one or more candidate cells with information about the UE 104. The UE 104 may then monitor link qualities for various handover execution conditions and, if a specified condition is detected, perform a handover to a target cell selected from the candidate cells without requiring an explicit handover command from the access node 108. The serving cell may not be notified when the handover execution condition is met, and the UE 104 may directly execute the handover toward the target cell.

In a CHO procedure, the network configures the UE with a list of one or more candidate cells and associated handover execution conditions. The network also "prepares" the target cells by reserving resources of each target cell for a possible handover of the UE, which may consume significant resources in the network (if many target cells are configured). CHO may also impose a cost on the UE (e.g., by increasing the number of cells it is expected to measure). If a UE can predict its mobility, it may notify the network which candidate target cells are unlikely to be used, so that the network can free resources in those cells and/or can permit the UE to discontinue measurement of those cells. Additionally or alternatively, if a UE can predict its mobility, it may suggest to the network new candidate target cells (e.g., in addition to the ones included in the list provided by the network), so that the network can prepare (and configure in the UE) cells which are more likely to be used for handover.

As in the baseline HO procedure described above, the UE may notify the network of its prediction of the next target cell(s) by sending the cell identit(y/ies) of the predicted next target cell(s) to the source gNB within an assistance message, which may be a radio resource control (RRC) message. A UEAssistanceInformation message as described above (e.g., with reference to FIG. 2 and/or FIG. 3) is one example of an assistance message that a UE may use to indicate UE assistance information to the network.

In another example, the UE may notify the network of its prediction of the next target cell(s) by sending the cell identit(y/ies) of the predicted next target cell(s) to the source gNB within a confirmation message, such as a RRCReconfigurationComplete message (as described, for example, in clause 6.2.2 of 3GPP TS 38.331, V16.4.1 (2021-04)) that is sent from the UE to the network. Such a message may include a list of "suggested target cells," which the network can use for subsequent CHO (re)configuration. Additionally or alternatively, such a message may include a list of "rejected target cells" (for example, out of a CondReconfigToAddModList field provided by the network, which may be included in a ConditionalReconfiguration IE of a RRCReconfiguration message). If the network accepts the UE recommendation, it may prepare new target cells and/or free resources in previously prepared target cells which are no longer needed, and the network may send the new CHO configuration to the UE. As described above, PCI, NR Cell Global Identity, or other identifiers can be used to identify the suggested or rejected target cells. Potential advantages of such a UE-assisted CHO procedure may include more optimal network resource utilization and/or increased mobility robustness.

Figure 4:
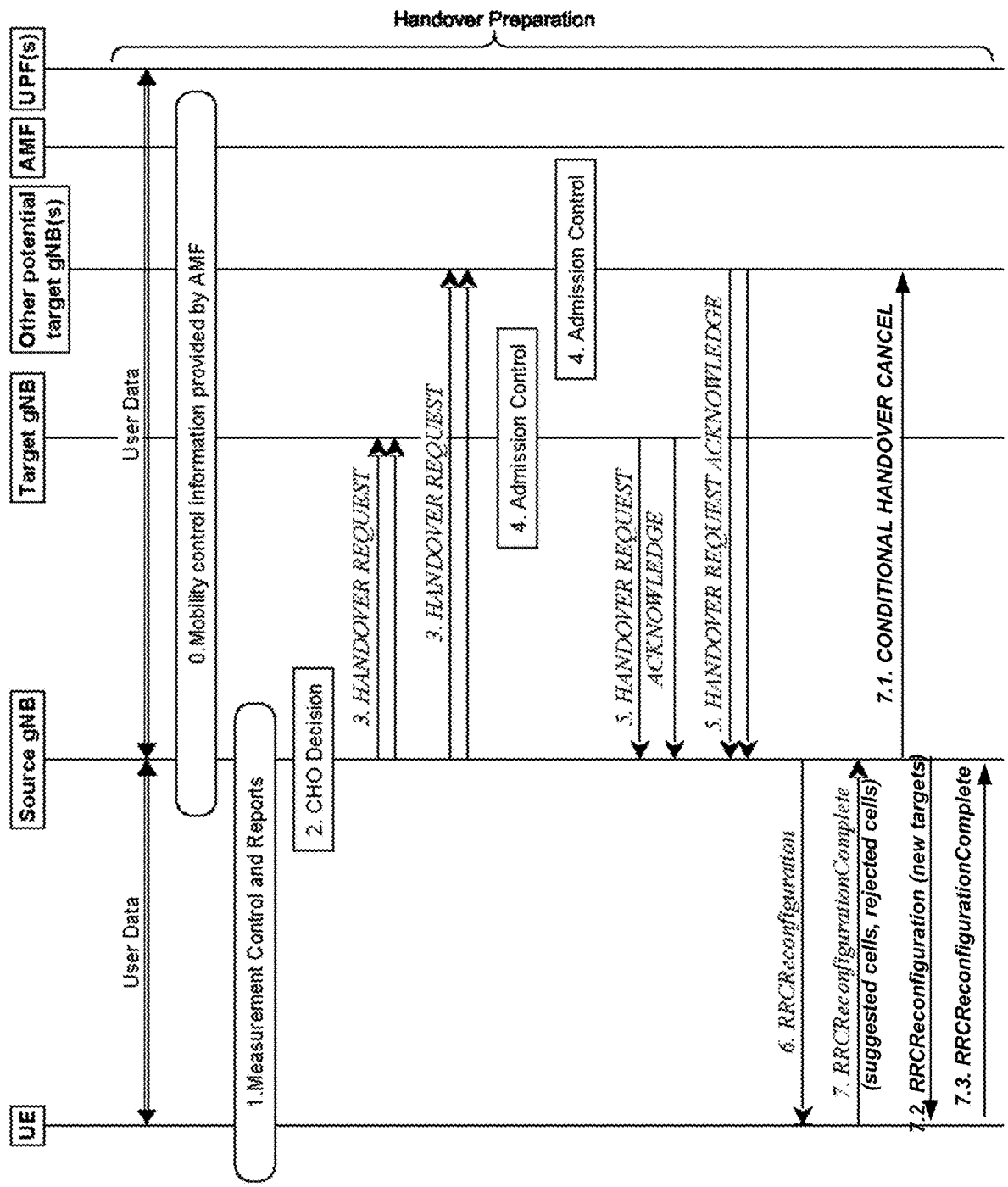
FIG. 4 shows an example call flow according to some embodiments.
Figure 5:
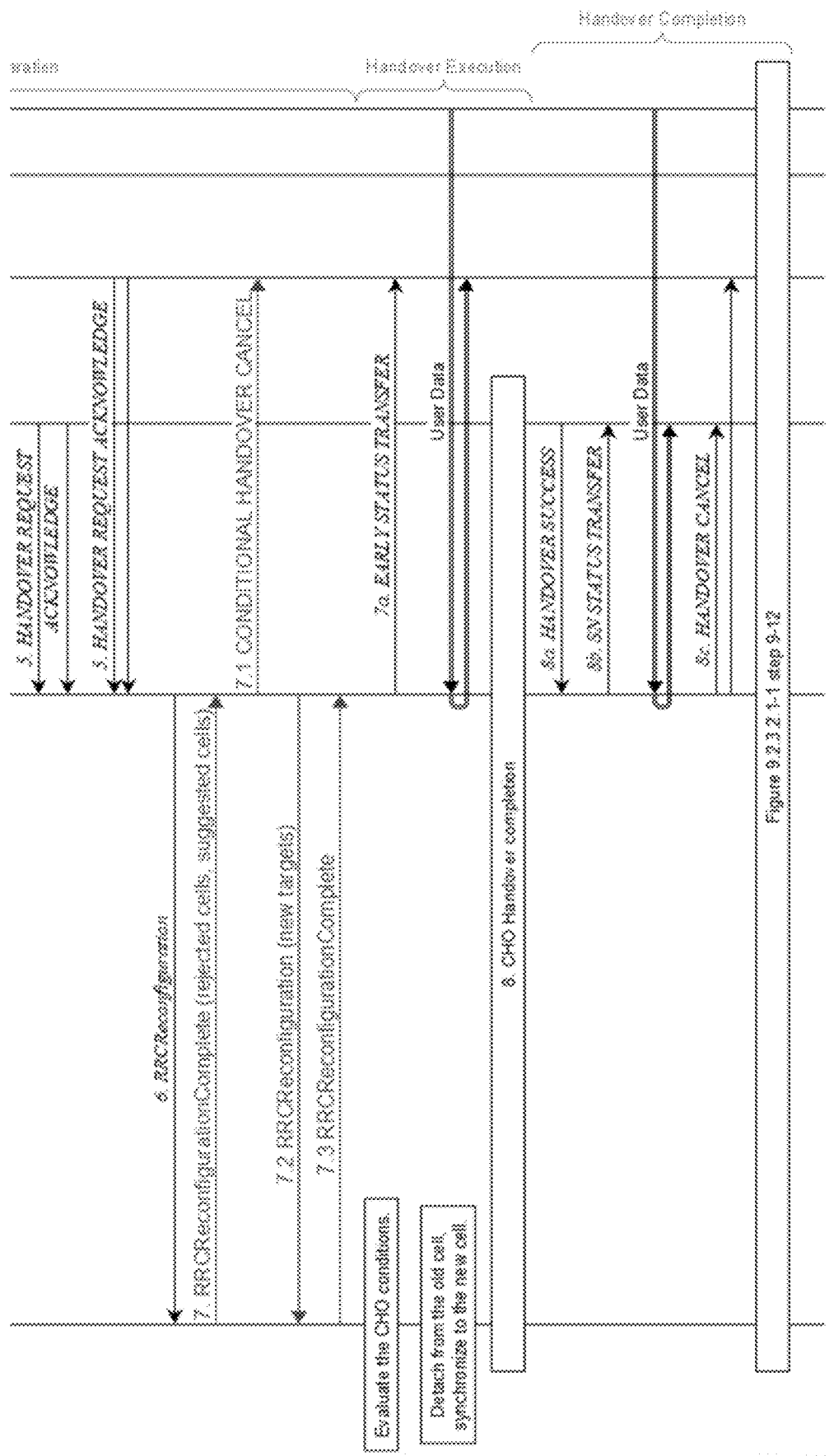
FIG. 5 shows a continuation of the call flow of FIG. 4.

FIG. 4 shows one example of a call flow in which a UE-based prediction as described above is incorporated into a CHO procedure. In this example, the UE-based prediction is incorporated into a CHO procedure as illustrated in Figure 9.2.3.2.1-1 ("Intra-AMF/UPF Handover") of 3GPP TS 38.300 v16.5.0 (2021-04). (FIG. 5 shows a continuation of the call flow of FIG. 4 that includes the same stages 5 to 7.3 of the call flow as shown in FIG. 4 and also includes subsequent operations of handover execution and handover completion.)

At stage 2 of the call flow as shown in FIG. 4, the source gNB decides to initiate the CHO procedure (e.g., based on measurement control information sent by the source gNB to the UE, and measurement reports received by the source gNB from the UE, in stage 1). In stage 3, the source gNB issues a HANDOVER REQUEST (e.g., over an Xn interface) to each of one or more target gNBs, requesting the target gNB to reserve resources for a potential handover of the UE. At stage 5, each target gNB provides a HANDOVER REQUEST ACKNOWLEDGE to the source gNB. At stage 6, the source gNB commands the UE to perform a reconfiguration of the RRC connection by providing a list of the candidate cells and associated handover execution conditions in a RRCReconfiguration message to the UE (e.g., in a CondReconfigToAddModList field of a ConditionalReconfiguration IE of the RRCReconfiguration message).

At stage 7, the UE responds to the conditional reconfiguration command by sending a RRCReconfigurationComplete message to the source gNB. As described above, such a message may include a list of "suggested target cells," which the network can use for subsequent CHO (re)configuration, and/or a list of "rejected target cells." In either case, the message may also include a weight for each identified target cell, where the weight may indicate, for example, a likelihood of HO success for the target cell. For a case in which the message identifies one or more rejected target cells to which the source gNB has already sent a HANDOVER REQUEST in stage 3, the source gNB may send a CONDITIONAL HANDOVER CANCEL to the target cell in stage 7.1 (e.g., to free up the reserved resources in that cell). At stage 7.2, the source gNB sends a new reconfiguration command that incorporates one or more of the UE predictions (e.g., suggested and/or rejected target cells) to the UE in a RRCReconfiguration message. For example, the RRCReconfiguration message may omit the target cell to which the CONDITIONAL HANDOVER CANCEL was sent in in stage 7.1. At stage 7.3, the UE confirms the conditional reconfiguration by sending a RRCReconfigurationComplete message to the source gNB.

In the particular example shown in FIG. 4, the UE uses a RRCReconfigurationComplete RRC message to send its prediction of the next target cell(s) to the source gNB. FIG. 6 shows one example of an ASN.1 signaling description that may be incorporated into such a message. In practice, the string "vlxyz" shown in this example may be replaced with the particular version number of the specification in which the embodiment is introduced (e.g., "v1710" for version 17.1.0). As shown in FIG. 6, this example of the RRCReconfigurationComplete RRC message includes a mobilityAssistance information element (IE) having a candidateBestTargetCell field, where the value of the candidateBestTargetCell field indicates the Physical Cell ID of a suggested target cell.

In the example of FIG. 6, the UE indicates one candidate target cell by using its Physical Cell Identity (PCI). Additionally or alternatively, the UE may indicate a candidate target cell (e.g., within a confirmation message, such as a RRCReconfigurationComplete message) by using one or more other identifiers (e.g., NR cell identity (NCI), NR cell global identifier (NCGI)). Additionally or alternatively, the UE may report (e.g., within a confirmation message, such as a RRCReconfigurationComplete message) two or more candidate target cells. In such case, the report may also include a weight for each identified candidate target cell, where the weight may indicate, for example, a likelihood of HO success for the candidate.

As shown in FIG. 6, this example of the RRCReconfigurationComplete RRC message also includes a condMobilityAssistance information element (IE) that may include a rejectedCellsList field and/or a suggestedCellsList field. Each of these fields may include a corresponding CandidateCellList data element that indicates one or more candidate cells by an corresponding cell identifier, such as, for example, PCI, NCI, and/or NCGI. In such case, the list may also include a weight for each identified candidate cell, where the weight may indicate, for example, a likelihood of HO success for the candidate.

Additionally or alternatively to baseline HO and/or CHO optimizations as described above, anticipation of UE mobility may be helpful for measurement optimization. Communication of history-based predictions from the UE to the network (e.g., using an assistance message, such as a UEAssistanceInformation message as described with reference to FIG. 3 above) can also be used for measurement optimization. For example, a network may use a UE-based prediction of the visibility of certain measurement objects to optimize measurement configuration by configuring only the best candidate cells (e.g., the candidate cells most likely to be measurable by the UE) for the UE to make measurements on. By performing the predictions only within the UE, the information upon which the predictions are based is kept confidential within the UE, and user privacy is preserved.

A measurement framework may be implemented, for example, such that the network configures the UE with a set of measurement objects (e.g., frequencies, cells, and/or beams to measure, etc.) and a measurement reporting configuration (e.g., periodic, triggered by a condition or other event, etc.). In one example, the network may perform the measurement configuration by sending the UE a command to perform a reconfiguration of the RRC connection, such as a RRCReconfiguration message, that may specify the measurement objects and the reporting configuration (e.g., the report triggering conditions). The UE may perform measurements on the configured measurement objects (e.g., frequencies, cells, and/or beams), and when the reporting conditions are met, the UE may report the measurement results to the network.

Such a measurement framework may be implemented to include UE-based mobility information. After configuration of the UE by the network for measurement as described above, for example, the UE may send assistance information to the network (e.g., in the form of a list of one or more rejected measurement objects and/or a list of one or more suggested measurement objects) that is based on a history of used measurement objects. By generating the assistance information entirely within the UE, the mobility information from which the assistance information was derived is kept confidential, and user privacy is preserved. The UE may send such assistance information in an assistance message (e.g., a UEAssistanceInformation message as described with reference to FIG. 3 above) and/or in a confirmation message (e.g., a RRCReconfigurationComplete message as described with reference to FIG. 6 above). In one example, the UE may use an assistance message (e.g., a UEAssistanceInformation message as described with reference to FIG. 3 above) to indicate to the network that it is unlikely to be in the coverage of some of the configured frequencies, beams, and/or cells (e.g., a list of one or more rejected measurement objects). Additionally or alternatively, the UE may use a confirmation message (e.g., a RRCReconfigurationComplete message as described with reference to FIG. 6 above) to indicate to the network that it is unlikely to be in the coverage of some of the configured frequencies, beams, and/or cells (e.g., a list of one or more rejected measurement objects).

Based on the assistance information received, the network may decide to update the measurement configuration. For example, the network may update the measurement configuration by reconfiguring the UE (e.g., using a command to perform a reconfiguration of the RRC connection, such as a RRCReconfiguration message) with a different set of measurement objects, which may include one or more measurement objects from the original set of measurement objects. The different set of measurement objects may include one or more measurement objects that were not included in the original set and/or may exclude one or more measurement objects that were included in the original set. Alternatively, the network may update the measurement configuration by indicating one or more measurement objects to be added to and/or one or more measurement objects to be omitted from the original set of measurement objects. If the network omits certain frequencies and/or cells and/or beams from the updated configuration, the amount of measurements to be performed by the UE may be reduced, thus resulting in a power saving for the UE.

As noted above, in addition to or in an alternative to cell identity, a UE may also predict (and signal to the network) one or more beams which are likely to be the best candidates. For example, communication of history-based information from the UE to the network (e.g., using an assistance message, such as a UEAssistanceInformation message as described with reference to FIG. 3 above) can also be used for beam failure detection (BFD) optimization.

A BFD procedure may be implemented such that the gNB configures the UE with BFD reference signals (BFD-RSs). The BFD-RSs may be synchronization signal blocks (SSBs) and/or channel state information-reference signals (CSI-RSs). When the number of beam failure instance indications from the physical layer reaches a configured threshold before a configured timer expires, the UE may declare a beam failure. When beam failure is declared, the UE may trigger a beam failure recovery (BFR) procedure by initiating a random access procedure, which takes some time and may be costly in terms of network resources.

A BFD procedure may be implemented to include UE-based mobility information. In one example, after configuration of the BFD-RSs by the network, the UE may use an assistance message (e.g., a UEAssistanceInformation message as described with reference to FIG. 3 above) to indicate to the network that it is unlikely to be in the coverage of some of the configured BFD-RSs (e.g., as described above with reference to measurement objects). Such a message may include, for example, a list of one or more rejected BFD-RSs (e.g., SSB IDs and/or CSI-RS IDs). Additionally or alternatively, such a message may include, for example, a list of one or more suggested BFD-RSs (e.g., SSB IDs and/or CSI-RS IDs).

In another example, the UE may determine that the configuration of BFD-RSs as received from the gNB is likely to result in a declaration of beam failure. For example, the UE may determine that it is unlikely to be in the coverage of one or more (possibly all) of the configured BFD-RSs (e.g., based on a history of used BFD-RSs, such as a time series of SSB IDs and/or CSI-RS IDs). Based on such a determination, the UE may indicate to the network an "anticipated" beam failure (e.g., using an assistance message, such as a UEAssistanceInformation message as described with reference to FIG. 3 above). In one example, the indication is implemented as a one-bit IE of the message (e.g., a binary flag). Based on such an indication, the network may provide a different configuration of BFD-RSs to the UE. Such a prediction-based reconfiguration may avoid the triggering of a random access procedure for beam failure recovery, thus reducing the likelihood of a potential service interruption.

As described above, model training may be performed internally in the UE (e.g., to preserve user privacy). The problem of training the model may be formulated as a time series prediction: e.g., prediction of the next cell based on past knowledge of the UE's mobility (e.g., a list of cells used in the past). It may be desired to implement such a model for time series prediction as a recurrent neural network (RNN) (for example, a long short-term memory (LSTM) network), although other network models having memory may also be used, or other types of network models (e.g., a convolutional neural network (CNN)) may also be used.

The model may work, for example, with any of the cell identities mentioned herein (PCI, NCI, NCGI). The data may be viewed as a time series of cell identities, where the previous n identities can be used to predict the identity (n+1): that is, the next cell identity the UE is the most likely to use. Alternatively, the model may be implemented to output a vector of likelihoods for a number of cell identities (e.g., a list of cell identities and corresponding weights) rather than a single best net cell identity.

In one example, the training set comprises m sequences of the form 'input ($PCI_1$, $PCI_2$, . . . , $PCI_n$), output ($PCI_{n+1}$).' Inference may be performed on a list of the n last cell identities from past knowledge of the UE's mobility (which may be stored locally in the UE (e.g., in a memory of the UE)), from which the model may predict the next cell identity (or a list of next cell identities with associated likelihood). The past knowledge of mobility that is used by the UE for the training and inference is not shared with the network, such that user privacy is preserved. The UE sends only the resulting predictions to the network, such that the underlying mobility information is not traceable by the network. It is noted that the various techniques described herein (e.g., with reference to the call flows and signaling descriptions as shown in FIGS. 2 to 6) are not limited to any particular form or model of prediction by the UE.

For measurement optimization and/or BFD optimization applications as described herein, model training and inference may be performed using identifiers of measurement objects used by the UE (for example, cell IDs, frequencies, beam identifiers (e.g., SSB IDs and/or CSI-RS IDs)) in the same manner as described above with reference to cell identities.

Figure 7:
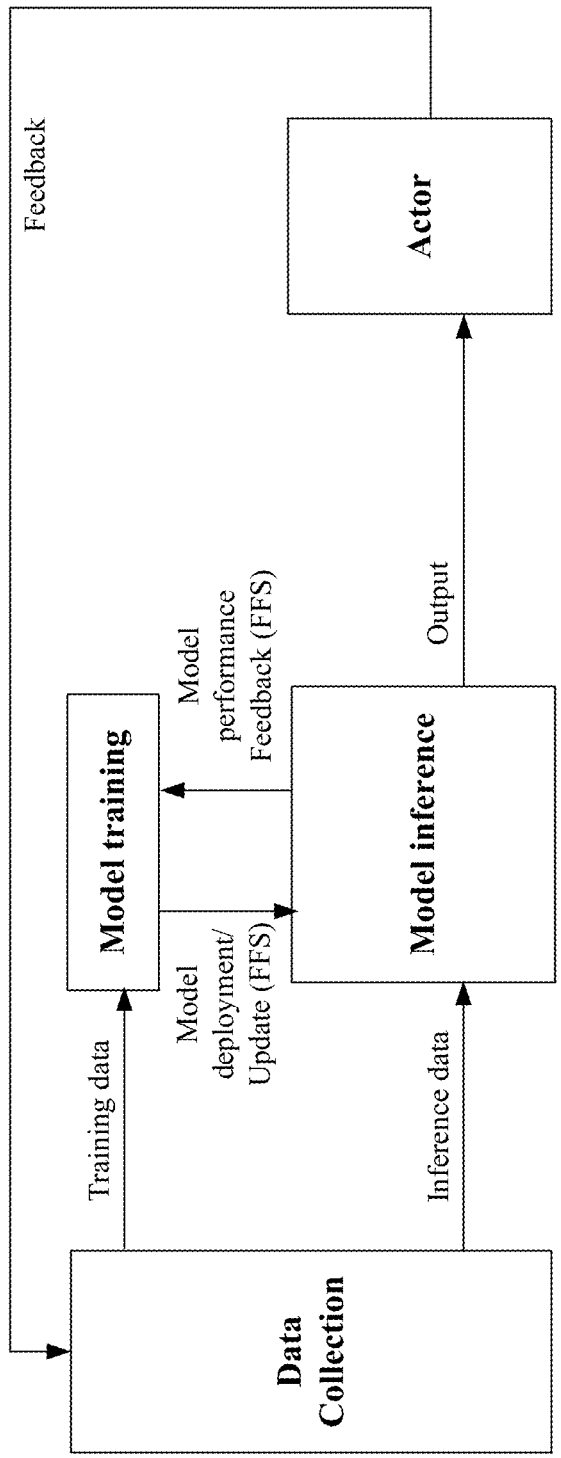
FIG. 7 shows a diagram of a functional framework for Radio Access network (RAN) intelligence.

FIG. 7 shows a diagram of a functional framework for Radio Access network (RAN) intelligence (as described in Figure 4.2-1 of 3GPP Technical Report (TR) 37.817, "3rd Generation Partnership Project; Technical Specification Group RAN; Evolved Universal Terrestrial Radio Access (E-UTRA) and NR; Study on enhancement for Data Collection for NR and EN-DC (Release 17)," V0.2.0 (2021-05)) which may be used to implement a prediction model as described herein within a UE. As noted above, in one such example, the model is implemented using an RNN.

Figure 8:
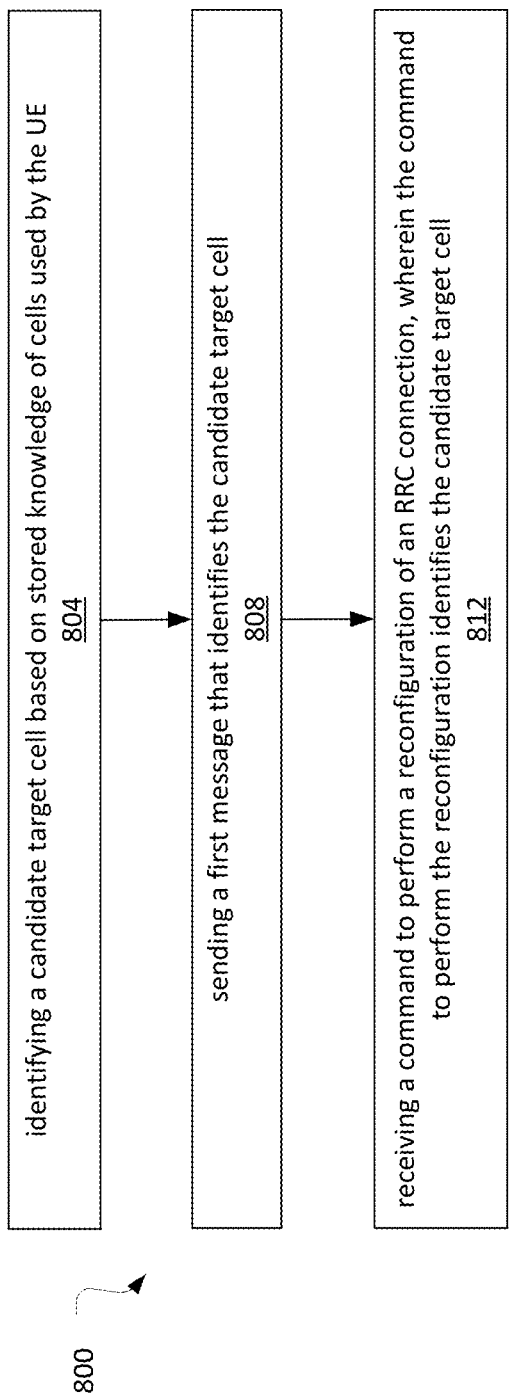
FIG. 8 illustrates an operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1300; or components thereof, for example, baseband processor 1304A.

The operation flow/algorithmic structure 800 may include, at 804, identifying a candidate target cell based on stored knowledge of cells used by the UE. For example, the operation flow/algorithmic structure 800 include using a recurrent neural network (RNN) to indicate the candidate target cell based on the stored knowledge. The RNN may be, for example, a long short-term memory (LSTM) network.

The operation flow/algorithmic structure 800 may include, at 808, sending a first message that identifies the candidate target cell. In one example, the first message is a UEAssistanceInformation message. In another example, the first message is a RRCReconfigurationComplete message. The first message may include an information element that identifies the candidate target cell. The first message may identify the candidate target cell by, for example, at least one among physical cell ID (PCI), New Radio (NR) cell identity (NCI), or NR cell global identifier (NCGI).

The operation flow/algorithmic structure 800 may include, at 812, receiving a command to perform a reconfiguration of a radio resource control (RRC) connection, wherein the command to perform the reconfiguration may identify the candidate target cell. The command to perform the reconfiguration may be, for example, a RRCReconfiguration message.

The operation flow/algorithmic structure 800 may further include sending a confirmation to the candidate target cell that the reconfiguration is completed. The confirmation may be, for example, a RRCReconfigurationComplete message.

FIG. 9 illustrates an operation flow/algorithmic structure 900 in accordance with some embodiments. The operation flow/algorithmic structure 900 may be performed or implemented by a UE such as, for example, UE 104 or UE 1300; or components thereof, for example, baseband processor 1304A.

The operation flow/algorithmic structure 900 may include, at 904, receiving a first message that identifies a measurement object. The first message may be a command to perform a reconfiguration of a radio resource control (RRC) connection. The measurement object may be, for example, a frequency, a cell, or a beam.

The operation flow/algorithmic structure 900 may include, at 908, based on the first message, generating a second message that indicates at least one of a prediction of a failure relating to the measurement object, or a rejection of the measurement object. The second message may be based on stored knowledge of measurement objects measured by a UE. For an example in which the measurement object is a synchronization signal block (SSB), the second message may indicate a prediction of a beam failure relating to the SSB. The second message may be an assistance information message (e.g., a UEAssistanceInformation message). Additionally or alternatively, the second message may identify the measurement object.

Figure 10:
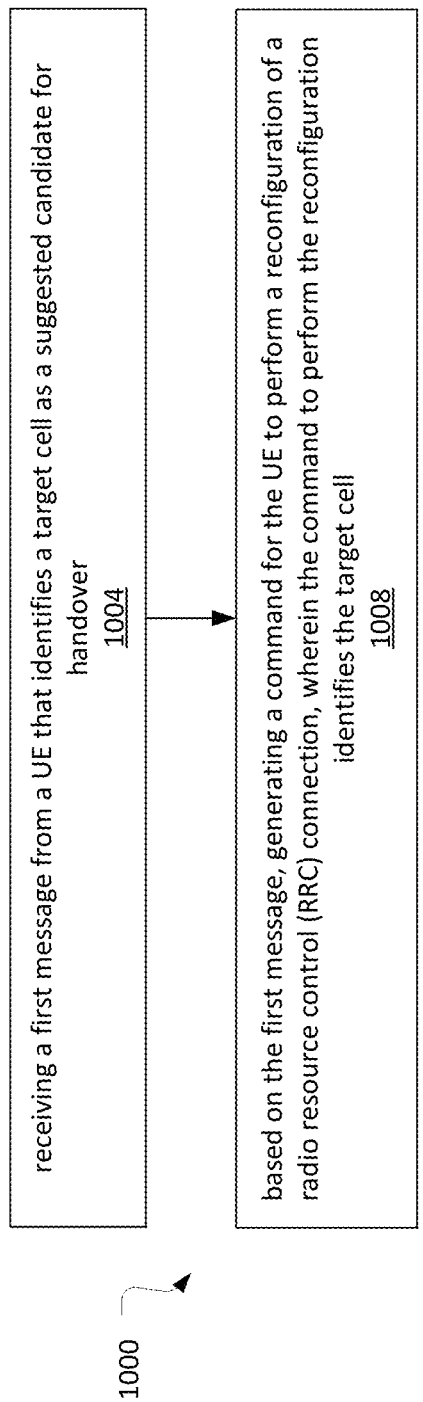
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a base station such as, for example, base station 108 or 1400; or components thereof, for example, baseband processor 1404A.

The operation flow/algorithmic structure 1000 may include, at 1004, receiving a first message from a user equipment (UE) that identifies a target cell as a suggested candidate for handover. The first message may be an assistance information message (e.g., a UEAssistanceInformation message). The target cell is one among a plurality of target cells identified in the first message. For each of the plurality of target cells, the first message includes a corresponding weight.

The operation flow/algorithmic structure 1000 may include, at 1008, based on the first message, generating a command for the UE to perform a reconfiguration of a radio resource control (RRC) connection, wherein the command to perform the reconfiguration identifies the target cell. The command to perform the reconfiguration may be, for example, a RRCReconfiguration message.

The operation flow/algorithmic structure 1000 may further include receiving a confirmation by the UE that the reconfiguration is completed. Alternatively or additionally, the operation flow/algorithmic structure 1000 may further include generating a handover request message to the target cell.

Figure 11:
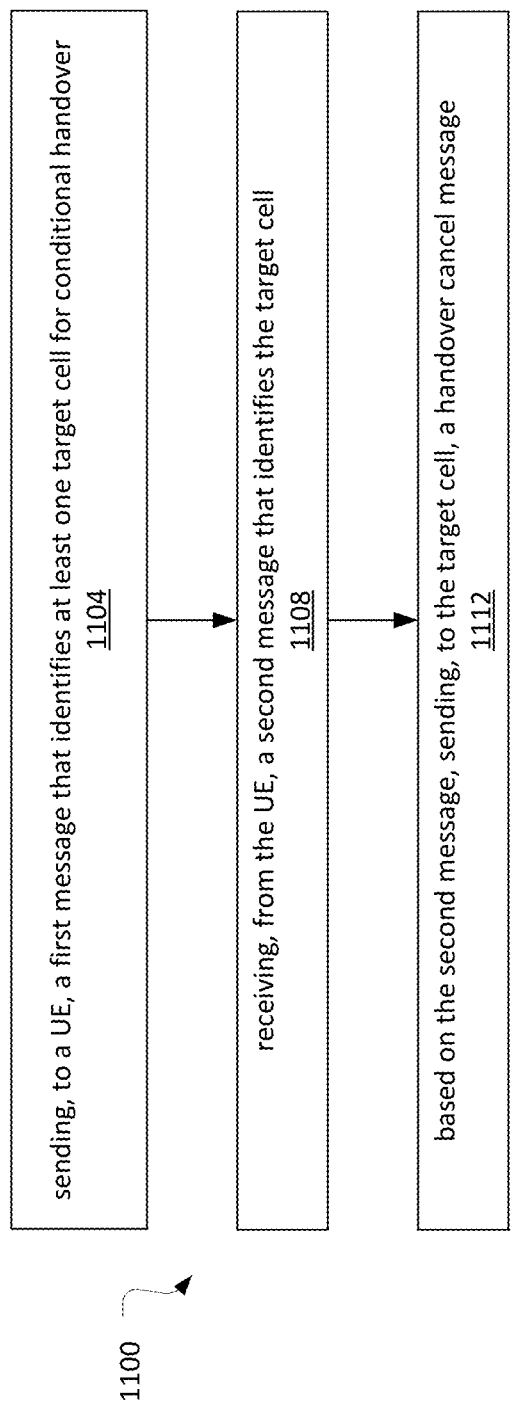
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a base station such as, for example, base station 108 or 1400; or components thereof, for example, baseband processor 1404A.

The operation flow/algorithmic structure 1100 may include, at 1104, sending, to a UE, a first message that identifies at least one target cell for conditional handover. The first message may be a command to perform a reconfiguration of a radio resource control (RRC) connection. For example, the first message may be a RRCReconfiguration message.

The operation flow/algorithmic structure 1100 may include, at 1108, receiving, from the UE, a second message that identifies the target cell. The second message may be a RRCReconfigurationComplete message.

The operation flow/algorithmic structure 1100 may include, at 1112, based on the second message, sending, to the target cell, a handover cancel message.

The operation flow/algorithmic structure 1100 may further include sending, to the UE and based on the second message, a command to perform a reconfiguration of an RRC connection (e.g., a RRCReconfiguration message). In such case, the operation flow/algorithmic structure 1100 may further include receiving, from the UE, a confirmation that the reconfiguration is completed (e.g., a RRCReconfigurationComplete message).

Figure 12:
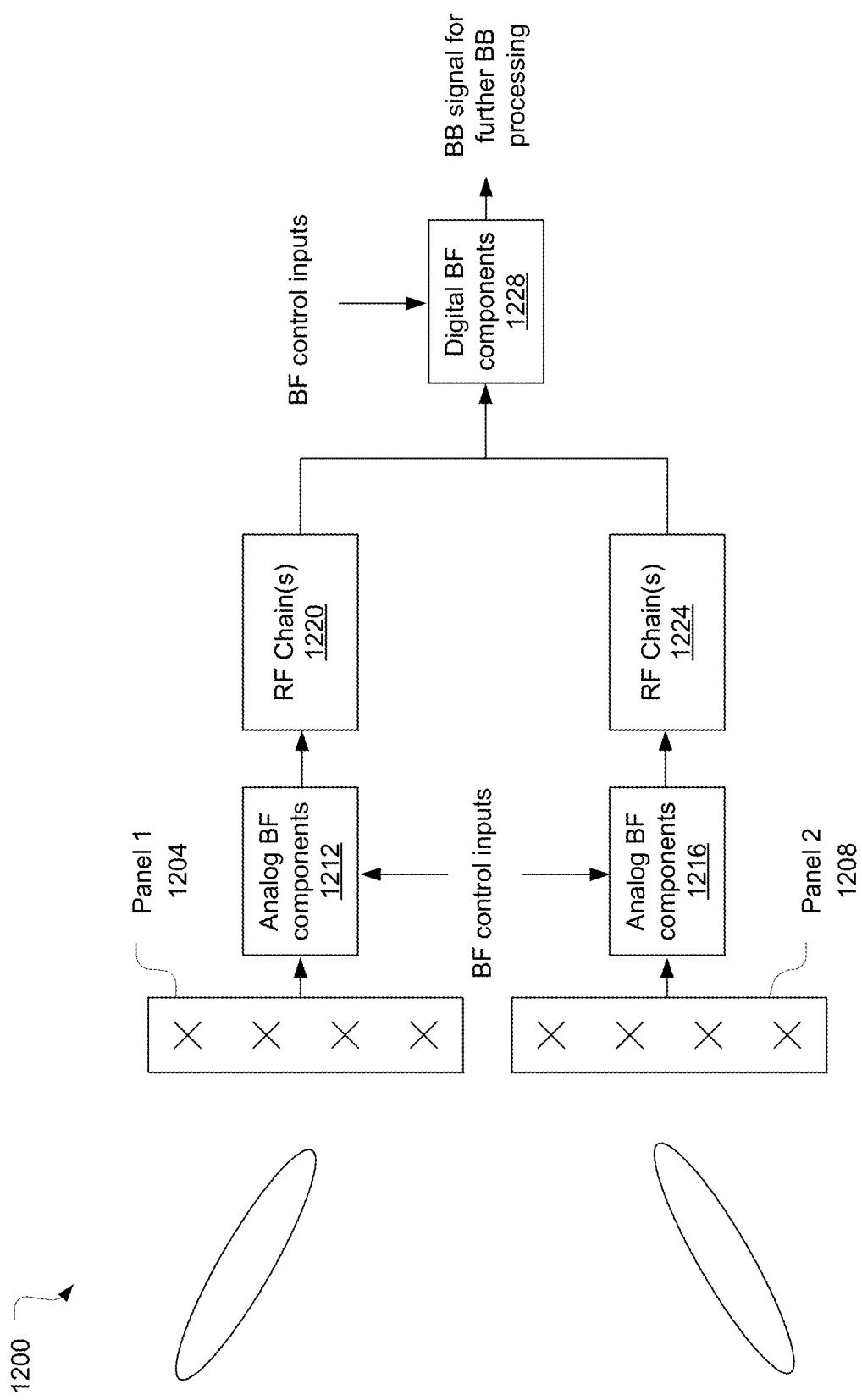
FIG. 12 illustrates beamforming components of a device in accordance with some embodiments.

FIG. 12 illustrates receive components 1200 of a device in accordance with some embodiments. The device may be the UE 104 or access node 108 or 112. The receive components 1200 may include a first antenna panel, panel 1 1204, and a second antenna panel, panel 2 1208. Each antenna panel may include a number of antenna elements.

The antenna panels may be coupled to respective analog beamforming (BF) components. For example, panel 1 1204 may be coupled with analog BF components 1212 and panel 2 1208 may be coupled with analog BF components 1216.

The analog BF components may be coupled with one or more radio-frequency (RF) chains. For example, analog BF components 1212 may be coupled with one or more RF chains 1220 and analog BF components 1216 may be coupled with one or more RF chains 1224. The RF chains may amplify a receive analog RF signal, downconvert the RF signal to baseband, and convert the analog baseband signal to a digital baseband signal, which may be provided to digital BF components 1228. The digital BF components 1228 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 1212 or complex weights provided to the digital BF components 1228. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 1200 describe receive beamforming, other embodiments may include beamforming components that perform transmit beamforming in analogous manners.

Figure 13:
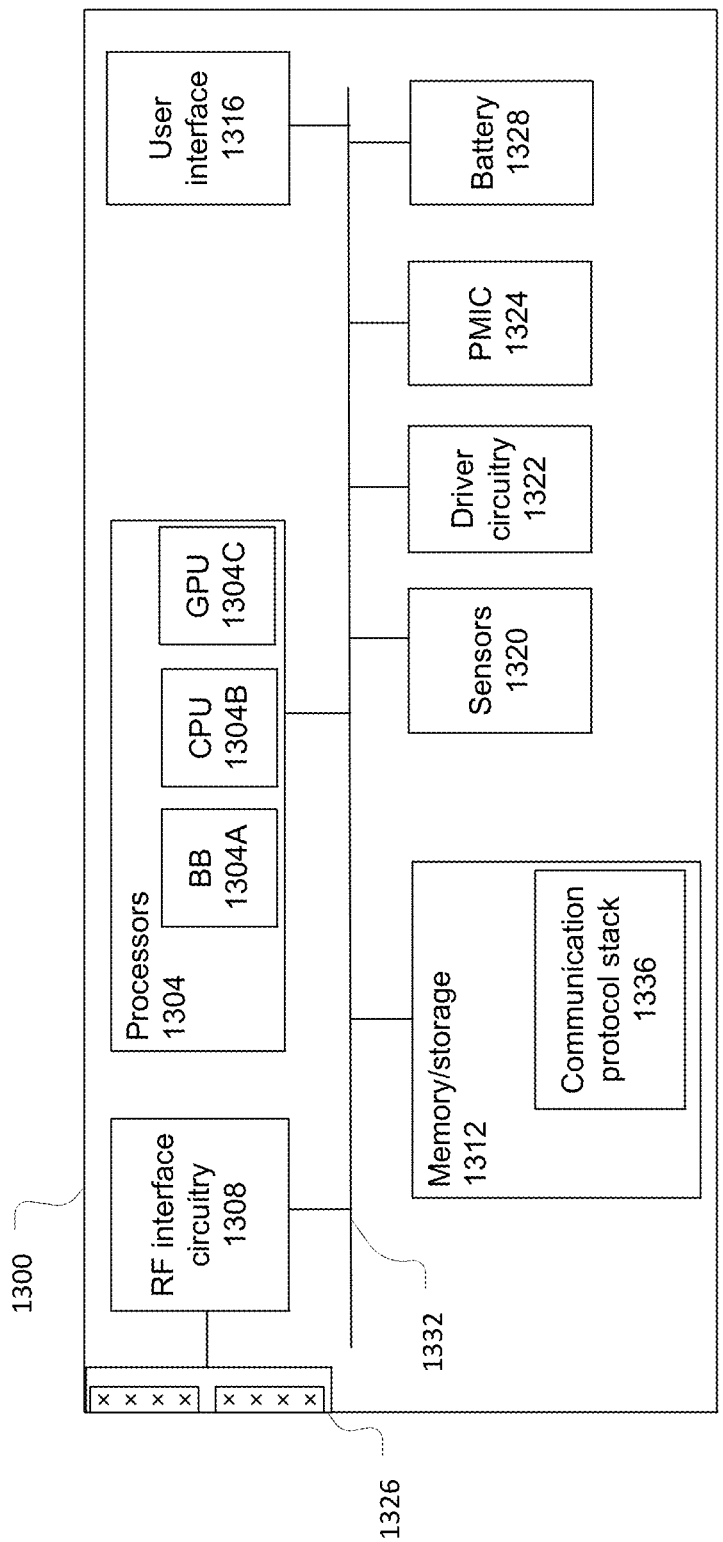
FIG. 13 illustrates a user equipment in accordance with some embodiments.

FIG. 13 illustrates a UE 1300 in accordance with some embodiments. The UE 1300 may be similar to and substantially interchangeable with UE 104 of FIG. 1.

The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1326.

In various embodiments, the RF interface circuitry 1308 may be configured to transmit/receive signals in a manner compatible with NR access technologies.

The antenna 1326 may include antenna elements to convert electrical signals into radio waves to travel through the air and to convert received radio waves into electrical signals. The antenna elements may be arranged into one or more antenna panels. The antenna 1326 may have antenna panels that are omnidirectional, directional, or a combination thereof to enable beamforming and multiple input, multiple output communications. The antenna 1326 may include microstrip antennas, printed antennas fabricated on the surface of one or more printed circuit boards, patch antennas, phased array antennas, etc. The antenna 1326 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300 including DRX as discussed herein.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
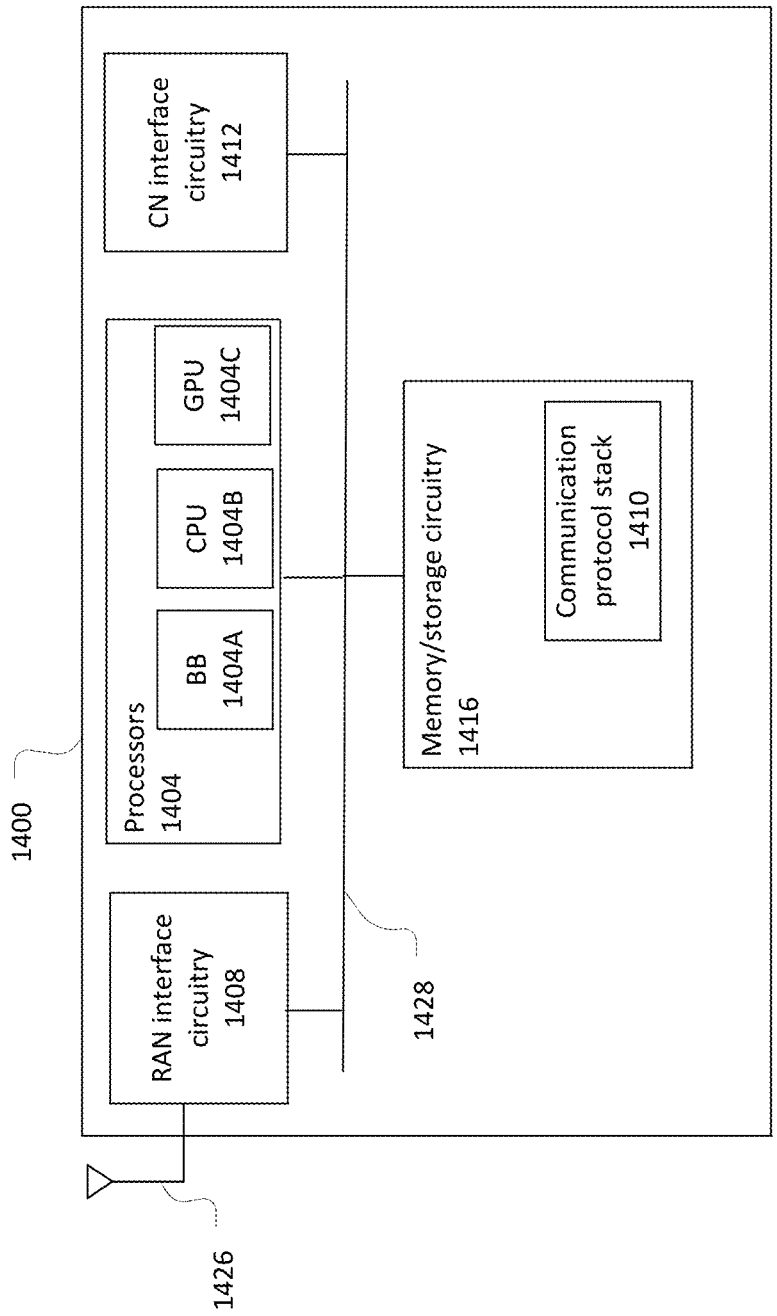
FIG. 14 illustrates a base station in accordance with some embodiments.

FIG. 14 illustrates an access node 1400 (e.g., a base station or gNB) in accordance with some embodiments. The access node 1400 may be similar to and substantially interchangeable with access node 108.

The access node 1400 may include processors 1404, RF interface circuitry 1408, core network (CN) interface circuitry 1412, memory/storage circuitry 1416, and antenna structure 1426.

The components of the access node 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

As described above, one aspect of the present technology is the gathering and use of data available from specific and legitimate sources for mobility optimization. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to reduce an incidence of handover failure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of mobility data during registration for services or anytime thereafter. In yet another example, users can select to limit the length of time mobility-associated data is maintained or entirely block the development of a history-based mobility prediction model. In addition to providing "opt in" and "opt out" options, the present disclosure contemplates providing notifications relating to the access or use of personal information. For instance, a user may be notified that history-based mobility predictions will be provided to the network.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes one or more computer-readable media having instructions that, when executed by one or more processors, cause a UE to identify a candidate target cell based on stored knowledge of cells used by the UE; send a first message that identifies the candidate target cell; and receive a command to perform a reconfiguration of an RRC connection, wherein the command to perform the reconfiguration identifies the candidate target cell.

Example 2 includes the one or more computer-readable media of Example 1 or some other example herein, wherein the candidate target cell is one among a plurality of candidate target cells identified in the first message, and for each of the plurality of candidate target cells, the first message includes a corresponding weight.

Example 3 includes the one or more computer-readable media of Example 1 or some other example herein, wherein the first message includes an information element that identifies the candidate target cell.

Example 4 includes the one or more computer-readable media of Example 1 or some other example herein, wherein the first message identifies the candidate target cell by at least one among PCI, NCI, or NCGI.

Example 5 includes the one or more computer-readable media of Example 1 or some other example herein, wherein the command to perform the reconfiguration is a RRCReconfiguration message.

Example 6 includes the one or more computer-readable media of Example 1 or some other example herein, wherein the instructions, when executed by the one or more processors, further cause the UE to send a confirmation to the candidate target cell that the reconfiguration is completed.

Example 7 includes the one or more computer-readable media of Example 6 or some other example herein, wherein the confirmation is a RRCReconfigurationComplete message.

Example 8 includes the one or more computer-readable media of any one of Examples 1-7 or some other example herein, wherein the first message is a UEAssistanceInformation message.

Example 9 includes the one or more computer-readable media of any one of Examples 1-7 or some other example herein, wherein the first message is a RRCReconfigurationComplete message.

Example 10 includes the one or more computer-readable media of any one of Examples 1-7 or some other example herein, wherein the instructions, when executed by the one or more processors, further cause the UE to use an RNN to indicate the candidate target cell based on the stored knowledge.

Example 11 includes an apparatus (e.g., a chip or chipset) comprising processing circuitry to receive a first message that identifies a measurement object; based on the first message, generate a second message that indicates a rejection of the measurement object, and memory coupled to the processing circuitry, the memory to store knowledge of measurement objects measured by a user equipment, wherein the measurement object comprises a frequency, a cell, or a beam; and the second message is based on the stored knowledge.

Example 12 includes the apparatus of Example 11 or some other example herein, wherein the measurement object comprises an SSB.

Example 13 includes the apparatus of Example 11 or some other example herein, wherein the first message is a command to perform a reconfiguration of an RRC connection.

Example 14 includes the apparatus of Example 11 or some other example herein, wherein the second message is an assistance information message.

Example 15 includes the apparatus of any one of Examples 11-14 or some other example herein, wherein the second message identifies the measurement object.

Example 16 includes an apparatus (e.g., a chip or chipset) comprising processing circuitry to receive a first message that identifies a BFD-RS; based on the first message, generate a second message that indicates a prediction of a beam failure relating to the BFD-RS, and memory coupled to the processing circuitry, the memory to store knowledge of BFD-RSs used by a user equipment, wherein the second message is based on the stored knowledge.

Example 17 includes the apparatus of Example 16 or some other example herein, wherein the first message is a command to perform a reconfiguration of an RRC connection.

Example 18 includes the apparatus of Example 16 or some other example herein, wherein the second message is an assistance information message.

Example 19 includes the apparatus of any one of Examples 16-18 or some other example herein, wherein the BFD-RS comprises an SSB.

Example 20 includes a method of operating a base station, the method comprising receiving a first message from a UE that identifies a target cell as a suggested candidate for handover; and based on the first message, generating a command for the UE to perform a reconfiguration of an RRC connection, wherein the command to perform the reconfiguration identifies the target cell.

Example 21 includes the method of Example 20 or some other example herein, the method further comprising receiving a confirmation by the UE that the reconfiguration is completed.

Example 22 includes the method of Example 20 or some other example herein, the method further comprising generating a handover request message to the target cell.

Example 23 includes the method of any one of Examples 20-22 or some other example herein, wherein the first message is an assistance information message.

Example 24 includes the method of any one of Examples 20-22 or some other example herein, wherein the target cell is one among a plurality of target cells identified in the first message as suggested candidates for handover.

Example 25 includes the method of Example 24 or some other example herein, wherein the command to perform the reconfiguration identifies more than one among the plurality of target cells.

Example 26 includes the method of Example 24 or some other example herein, wherein for each of the plurality of target cells, the first message includes a corresponding weight.

Example 27 includes one or more computer-readable media comprising instructions that, when executed by one or more processors, cause a base station to send, to a UE, a first message that identifies at least one target cell for conditional handover; receive, from the UE, a second message that identifies the target cell; and based on the second message, send, to the target cell, a handover cancel message.

Example 28 includes the one or more computer-readable media of Example 27 or some other example herein, wherein the first message is a command to perform a reconfiguration of an RRC connection.

Example 29 includes the one or more computer-readable media of Example 27 or some other example herein, wherein the second message is a RRCReconfigurationComplete message.

Example 30 includes the one or more computer-readable media of any one of Examples 27-29 or some other example herein, wherein the instructions, when executed by the one or more processors, further cause the base station to send, to the UE and based on the second message, a command to perform a reconfiguration of an RRC connection.

Example 31 includes the one or more computer-readable media of Example 30 or some other example herein, the method further comprising receiving, from the UE, a confirmation that the reconfiguration is completed.

Example 32 may include an apparatus comprising means to perform one or more elements of a method described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 may include an apparatus comprising logic, modules, or circuitry to perform one or more elements of a method described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-31, or portions thereof.

Example 37 may include a signal as described in or related to any of examples 1-31, or portions or parts thereof.

Example 38 may include a datagram, information element, packet, frame, segment, PDU, or message as described in or related to any of examples 1-31, or portions or parts thereof, or otherwise described in the present disclosure.

Example 39 may include a signal encoded with data as described in or related to any of examples 1-31, or portions or parts thereof, or otherwise described in the present disclosure.

Example 40 may include a signal encoded with a datagram, IE, packet, frame, segment, PDU, or message as described in or related to any of examples 1-31, or portions or parts thereof, or otherwise described in the present disclosure.

Example 41 may include an electromagnetic signal carrying computer-readable instructions, wherein execution of the computer-readable instructions by one or more processors is to cause the one or more processors to perform the method, techniques, or process as described in or related to any of examples 1-31, or portions thereof.

Example 42 may include a computer program comprising instructions, wherein execution of the program by a processing element is to cause the processing element to carry out the method, techniques, or process as described in or related to any of examples 1-31, or portions thereof.

Example 43 may include a signal in a wireless network as shown and described herein.

Example 44 may include a method of communicating in a wireless network as shown and described herein.

Example 45 may include a system for providing wireless communication as shown and described herein.

Example 46 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that are to be executed to cause a processing circuitry to:
   predict a candidate target cell based on stored knowledge of cells previously used by a user equipment (UE);
   generate, for transmission to a network, a message that identifies the candidate target cell; and
   process a command to perform a reconfiguration of a radio resource control (RRC) connection, wherein:
      the command to perform the reconfiguration is received from the network and identifies the candidate target cell;
      the candidate target cell is one among a plurality of candidate target cells identified in the message; and
      for each of the plurality of candidate target cells, the message includes a corresponding weight.

2. The one or more non-transitory computer-readable media of claim 1, wherein the message includes an information element that identifies the candidate target cell.

3. The one or more non-transitory computer-readable media of claim 1, wherein the message identifies the candidate target cell by at least one among physical cell ID (PCI), New Radio (NR) cell identity (NCI), or NR cell global identifier (NCGI).

4. The one or more non-transitory computer-readable media of claim 1, wherein the command to perform the reconfiguration is a RRCReconfiguration message.

5. The one or more non-transitory computer-readable media of claim 1, wherein the instructions are to be executed to further cause the processing circuitry to:
   generate a confirmation to be sent to the candidate target cell that the reconfiguration is completed.

6. The one or more non-transitory computer-readable media of claim 1, wherein the confirmation is a RRCReconfigurationComplete message.

7. The one or more non-transitory computer-readable media of claim 1, wherein the message is a UEAssistanceInformation message.

8. The one or more non-transitory computer-readable media of claim 1, wherein the message is a RRCReconfigurationComplete message.

9. The one or more non-transitory computer-readable media of claim 1, wherein the instructions are to be executed to further cause the processing circuitry to:
   use a recurrent neural network (RNN) to indicate the candidate target cell based on the stored knowledge.

10. An apparatus comprising:
    processing circuitry configured to:
       predict a candidate target cell based on stored knowledge of cells previously used by a user equipment (UE);
       generate, for transmission to a network, a message that identifies the candidate target cell; and process a command to perform a reconfiguration of a radio resource control (RRC) connection, wherein:
the command to perform the reconfiguration is received from the network and identifies the candidate target cell;
the candidate target cell is one among a plurality of candidate target cells identified in the message; and
for each of the plurality of candidate target cells, the message includes a corresponding weight; and
memory interface circuitry, coupled with the processing circuitry, to store the knowledge of cells previously used by the UE in memory.

11. The apparatus of claim 10, wherein the message includes an information element that identifies the candidate target cell.

12. The apparatus of claim 10, wherein the message identifies the candidate target cell by at least one among physical cell ID (PCI), New Radio (NR) cell identity (NCI), or NR cell global identifier (NCGI).

13. The apparatus of claim 10, wherein the command to perform the reconfiguration is a RRCReconfiguration message.

14. The apparatus of claim 10, wherein the message is a UEAssistanceInformation message.

15. The apparatus of claim 10, wherein the processing circuitry is further to:
use a recurrent neural network (RNN) to indicate the candidate target cell based on the stored knowledge.

16. A method comprising:
predicting a candidate target cell based on stored knowledge of cells previously used by a user equipment (UE);
generating, for transmission to a network, a message that identifies the candidate target cell; and
processing a command to perform a reconfiguration of a radio resource control (RRC) connection, wherein:
the command to perform the reconfiguration is received from the network and identifies the candidate target cell;
the candidate target cell is one among a plurality of candidate target cells identified in the message; and
for each of the plurality of candidate target cells, the message includes a corresponding weight.

17. The method of claim 16, wherein the message includes an information element that identifies the candidate target cell.

18. The method of claim 16, wherein the message identifies the candidate target cell by at least one among physical cell ID (PCI), New Radio (NR) cell identity (NCI), or NR cell global identifier (NCGI).

19. The method of claim 16, wherein the command to perform the reconfiguration is a RRCReconfiguration message.

20. The method of claim 16, wherein the message is a RRCReconfigurationComplete message.

* * * * *